US00RE34669E

United States Patent [19]

Frigo et al.

[11] E Patent Number: Re. 34,669

[45] Reissued Date of Patent: Jul. 19, 1994

[54] METHOD FOR PREPARING MOULDED POLYUREAPOLYURETHANE FLEXIBLE FOAMS

[75] Inventors: Roberto Frigo; Gian-Carlo Bagaglio, both of Varese, Italy; Gabriel Verhelst, Herent; Mireille De Witte, Ghent, both of Belgium

[73] Assignees: Imperial Chemical Industries PLC, England; Atlas Europol SpA, Italy

[21] Appl. No.: 803,959

[22] Filed: Dec. 9, 1991

Related U.S. Patent Documents

Reissue of:

[64] Patent No.: 5,034,427
Issued: Jul. 23, 1991
Appl. No.: 440,399
Filed: Nov. 22, 1989

[30] Foreign Application Priority Data

Nov. 25, 1988 [GB] United Kingdom ..... 8827589
Oct. 17, 1989 [GB] United Kingdom ..... 8923354

[51] Int. Cl.[5] ..... C08G 18/14
[52] U.S. Cl. ..... 521/163
[58] Field of Search ..... 521/163

[56] References Cited

U.S. PATENT DOCUMENTS 4,722,942 2/1988 Nichols et al. ..... 521/163
4,774,264 9/1988 Weber et al. ..... 521/163
4,798,851 1/1989 Werner et al. ..... 521/163

*Primary Examiner*—Maurice J. Welsh
*Attorney, Agent, or Firm*—Cushman, Darby & Cushman

[57] ABSTRACT

A method to prepare polyurethane and/or polyurea flexible foams which comprises reacting:

A. an organic polyisocyanate composition
B. an isocyanate-reactive composition containing:
  a. at least one high Mw isocyanate-reactive compound
  $b_1$. a primary or secondary amino-functional compound (so-called chain-extender) of Mw below 1000 in an amount of less than 1% by wt of high Mw isocyanate-reactive compound(s) or
  $b_2$. a mixture of at least two chain extenders of which at least one is a primary or secondary amino-functional compound of Mw below 1000, in an amount of 0.1% to 10% by wt of high Mw isocyanate-reactive compound(s)
C. $H_2O$
D. optionally catalysts
E. optionally further blowing agents which are different from $H_2O$.
F. optionally further conventional additives.

10 Claims, No Drawings

METHOD FOR PREPARING MOULDED POLYUREAPOLYURETHANE FLEXIBLE FOAMS

Matter enclosed in heavy brackets [ ] appears in the original patent but forms no part of this reissue specification; matter printed in italics indicates the additions made by reissue.

The invention relates to the manufacture of polyurethane and/or polyurea flexible foams.

The manufacture of polyurethane/polyurea flexible foams is well known in the art and methods for their preparation have been fully described in the literature.

It is known to manufacture flexible polyurethane foams by reacting isocyanate with isocyanate-reactive compositions containing high molecular weight compounds, in the presence of blowing agents.

It is also known to include in the isocyanate-reactive composition a chain extended such as 1,4 butane diol, alone or in admixture with phenyldiethanolamine or aromatic polyamines.

Thus GB 2041387 describes the manufacture of microcellular flexible PU foams by reacting isocyanate with a high molecular weight polyether polyol and a mixture of 1,4 butane diol and phenyldiethanolamine, the amount of those low molecular weight compounds ranging from 0.2% to 40% by weight of polyether polyol.

The use of relatively high amounts of aromatic diamines as chain extenders for free rise or sprayed polyurethane/polyurea foams has also been disclosed, in EP 177766. It has now been found that flexible polyurethane/polyurea foams, having improved mechanical properties and reduced densities, can be obtained by reacting isocyanate with an isocyanate-reactive composition which contains reduced amounts of a primary or secondary amino-functional compound of low Mw, or which contains at least 2 low molecular weight isocyanate-reactive compounds of which at least one is a primary or secondary amine-functional compound.

Thus, according to the present invention there is provided a method to prepare polyurethane and/or polyurea flexible foams which comprises reacting:

A. an organic polyisocyanate composition

B. an isocyanate-reactive composition containing:

a) at least one high Mw isocyanate-reactive compound;

$b_1$) a primary or secondary amino-functional compound (Iso-called chain-extender) of Mw below 1000 in an amount of less than 1% by wt of high Mw isocyanate-reactive compound(s) or $b_2$) a mixture of at least two chain-extenders of which at least one is a primary or secondary amino-functional compound of Mw below 1000, in an amount of 0.1% to 10% by wt of high Mw isocyanate-reactive compound(s)

C) $H_2O$

D) optionally catalysts

E) optionally further blowing agents which are different from $H_2O$

F) optionally further conventional additives.

Polyisocyanate compositions which may be reacted with the isocyanate-reactive compositions of the invention may include any of the aliphatic, cyclo-aliphatic, araliphatic or aromatic polyisocyanates known in polyurethane or polyurea chemistry, especially those that are liquid at room temperature.

Examples of suitable polyisocyanates include 1,6-hexamethylene diisocyanate, isophorone diisocyanate, cyclohexane-1,4-diisocyanate, 4,4'-dicyclohexylmethane diisocyanate, 1,4-xylylene diisocyanate, 1,4-phenylene diisocyanate, 2,4-toluene diisocyanate, 2,6-toluene diisocyanate, 2,4'-diphenylmethane diisocyanate, polymethylene polyphenylene polyisocyanates (crude MDI) and 1,5-naphthylene diisocyanate. Mixtures of polyisocyanates can be used and also polyisocyanates which have been modified by the introduction of urethane, allophanate, urea, biuret, carbodiimide, uretonimine or isocyanature residues.

In general, the aromatic polyisocyanates are preferred, especially the available MDI isomers, that is to say 4,4'-diphenylmethane diisocyanate, 2,4'-diphenylmethane diisocyanate and mixtures thereof. MDI variants such as uretonimine-modified MDI and MDI prepolymers are also of great value in the moulding process.

Suitable high molecular weight isocyanate-reactive compounds have molecular weight of 1000–10,000, preferably 1000–7000.

Their functionality should range from 2–6, preferably 2–4.

Typical high molecular weight isocyanate-reactive compounds include polyols, polyamines, imino-functional compounds and mixtures thereof.

Suitable polyols and methods for their preparation have been fully described in the prior art and, as example of such polyols, there may be mentioned polyesters, polyesteramides, polythioethers, polycarbonates, polyacetals, polyolefins, polysiloxanes and, especially, polyethers.

Polyether polyols which may be used include polyoxyalkylene polyether polyols obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol, pentaerythritol or sorbitol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of propylene and ethylene oxides to di- or trifunctional initiators as fully described in the prior art. Mixtures of the said diols and triols can be particularly useful. Other useful polyether include polytetramethylene glycols obtained by the polymerisation of tetrahydrofuran.

Polyester polyols which may be used include hydroxylterminated reaction products of polyhydric alcohols such as ethylene glycol, propylene glycol, diethylene glycol, 1,4-butanediol, bis(hydroxyethyl)terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, or its derivatives such as tetrachlorophthalic or tetrabromophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, may also be used.

Polythioether polyols which may be used include products obtained by condensing thiodiglycol either alone or with other glycols, alkylene oxides, dicarboxylic acids, formaldehyde, amino-alcohols or aminocarboxylic acids. Polycarbonate polyols which may be used include products obtained by reacting diols such as 1,3-propanediol, 1,4-butanediol, 1,6-hexanediol, diethylene glycol or tetraethylene glycol with diaryl carbonates for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butandiene homo- and copolymers and suitable polysiloxane polyols include polydimethylsiloxane diols and triols.

Other suitable polyol compositions which can be used include for example polyhydroxyl derivatives which contain high molecular polyaddition or polycondensation polymers in dispersed or soluble state. Such polyhydroxyl derivatives can for example be obtained by carrying out a polyaddition reaction (for instance between polyisocyanates and amino-functional compounds) or a polycondensation reaction (for instance between formaldehyde and phenols and/or amines) in situ in such polyols as already disclosed above. Suitable are also polyhydroxyl derivative modified by vinyl-polymerisation, such as for example obtained by polymerising styrene and acrylonitrile in the presence of polyether polyols for polycarbonate polyols.

Other useful isocyanate-reactive polymers include polymeric polyamines, especially diamines and triamines, corresponding to the above described polymeric polyols. Suitable polyamines include products obtained by the reductive amination of polyether polyols as described, for example, in U.S. Pat. No. 3,654,370 or by the cyanoethylation of polyols followed by hydrogenation. Polyoxypropylene diamines and triamines and mixtures thereof are preferred. Also useful are polymers containing both amino and hydroxyl groups obtained by the partial amination of polyols.

Imino-functional compounds which may be used are imino-functional compounds capable of reacting directly with polyisocyanates without prior cleavage of the C=N bond to form a monomeric byproduct. Suitable imino-functional compounds include imino-functional polyether resins.

"Imino-functional" as used herein means that a reactant contains the grouping:

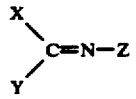

wherein X, Y and Z are chemical moieties which collectively form the rest of said compound and are each independently selected from hydrogen and organic radicals which are attached to the imino unit:

C=N– of said compound through N, C, O, S, Si or P, the central carbon atom of said imino unit being bonded to three atoms.

In the above structure, neither the carbon nor the nitrogen atom of the imino unit should be incorporated within an aromatic or other fully conjugated ring or ring system. It is preferred that Z is attached to the imino unit through saturated atoms, preferably aliphatic carbon atoms.

The range of imino-functional reagents which may be used in the invention is not limited by or to any particular chemistry of the preparation of said reagents. For example, imine terminated aliphatic polyethers may be made by a number of different routes. Specifically, the amine groups (—$NH_2$) of an aliphatic amine-terminated polyether can be prereacted with an aldehyde ($XCH_2CHO$) or a ketone (X—CFO—Y), to form, respectively, the corresponding aldimine $-N{=}CHCH_2X$ or the corresponding ketimine

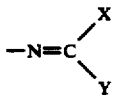

or the aldehyde and/or ketone group of an aldehyde and/or ketone-terminated polyether, can be prereacted with an aliphatic primary mono-amine to form, respectively, the corresponding aldimine and/or ketimine-terminated polyethers:

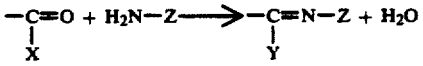

The preparation of imino functional groups in both cyclic and acyclic forms is well known in the literature, such as from "The Chemistry of the Carbon-Nitrogen Double Bond", Ed. S. Patai, Interscience Publishers, London, 1970 and references therein.

Enamine-containing compounds which may be present include compounds having the structures:

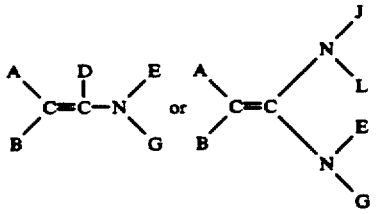

wherein each of A, B, D, E, G, J and L, independently, represents hydrogen or, preferably, an optionally substituted hydrocarbon radical, any of A, B and D and, independently, any of E, G, J and L optionally being joined together to form one or more carbocyclic or heterocyclic rings.

In many preferred enamine-functional compounds E, G, J and L are not hydrogen. It is also preferred that not both of A and B are hydrogen. Especially useful enamino-functional compounds contain two or more enamine groups as a result of any of A, B, D, E, G, J and/or L being a radical terminating in one or more enamino groups.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproaldehyde, cyclohexyladhyde, acetone, methyl ethyl ketone, benzyl methyl ketone, cyclopentanone, cyclohexanone, trimethylcyclohexanone, mixtures of these and the like with a secondary amine, for example a secondary amino-terminated polymer such as a polyether.

Mixtures of isocyanate-reactive polymers may be used. Such mixtures may contain components differing in respect of molecular weight, functionality, nature of isocyanate-reactive groups or polymer backbone.

It is an essential requirement of this invention that the isocyanate-reactive composition should contain a primary or secondary amino-functional compound having at least 2 isocyanate-reactive groups of Mw below 1000, preferably of Mw in the range of 60 to below 1000, in an amount of less than 1% by wt of high Mw isocyanate-reactive compound(s). Particularly preferred amounts of low Mw amino-functional compounds (so-called chain-extenders) should range from 0.2% to 0.8% by wt of isocyanate-reactive compound(s).

It is a still further aspect of the invention to provide an isocyanate-reactive composition comprising a mixture of at least two chain-extenders of which at least one is a primary or secondary amino-functional compound having at least 2 isocyanate-reactive groups, said mixture of chain-extenders being used in amounts ranging from 0.1% to 10% by wt of high Mw isocyanate-reactive compound(s).

Preferably, the amount of primary or secondary amino-functional compound present in said mixture of chain-extenders should be of less than 1% by weight of high Mw isocyanate-reactive compound(s).

Suitable primary or secondary amino-functional compounds used in this invention may be a $C_2$–$C_{30}$-aliphatic, $C_4$–$C_{30}$-cycloaliphatic, aromatic, or araliphatic polyamine or combinations thereof. Suitably employed as aliphatic and cycloaliphatic amines are ethylene diamine, propylene diamine, diethylene amine, hexamethylene diamine, amine terminated polyoxypropylene oligomers of under 1000 molecular weight, trimethyl hexamethylene diamine, isophorone diamine, 1-amino-3-amino-3,5,5-trimethyl cyclohexane, fully hydrogenated di(aminophenyl)methane, piperazine, hydrogenated methylene dianiline, diamino methane, and hydrogenated toluene diamine. The most useful of these are those that are liquids below about 110° C.

It is preferred to use aromatic diamines which have at least one linear alkyl substituent in ortho position to the one amino group and two linear alkylsubstituents, preferably with 1 to 3 carbon atoms, in both ortho positions of the other amino group. Most preferred are those diamines which have an alkyl substituent in all ortho positions to both amino groups.

Suitable aromatic isocyanate-reactive compounds are described as chain extenders in various patents, including U.S. Pat. Nos. 3,428,610; 4,218,543; 4,374,210; 4,396,729; 4,288,564; 4,298,701; 4,296,212; 4,379,105 and 4,442,235. Examples of aromative diamine chain extenders include toluenediamine including 2,4- and 2,6-diaminotoluenes; 2,5-diaminoxylene; 1,3-diethyl-2,4-diaminobenzene; 2,4-diaminomesitylene; 1-ethyl-2,6-diaminobenzene; 1-methyl-3,5-diethyl-2,4-diaminobenzene; 1-methyl-3,5-diethyl-2,6-diaminobenzene; 1,3,5-triethyl-2,6-diaminobenzene; 3,5,3',5'-tetra-ethyl-4,4'-diaminodiphenylmethane; 2,6-diethylnaphth-ylene-1,5diamine; 2-ethyl-1,3-diaminobenzene; 4,4'-diaminodiphenylmethane; 1,2-, 1,3-, or 1,4-phenylene diamine; 2,4'- or 4,4'-diaminodiphenylmethane; naphthylene-1,5-diamine; triphenylmethane-4,4'-4''-triamine. A more preferred compound is 1,3,5-triethyl-2,6- diaminobenzene. Most preferred is an 80:20 (w/w) mixture of 3,5-diethyl-2,4- diaminotoluene and 3,5-diethyl-2,6-diaminotoluene. This mixture is universally referred to as DETDA.

Suitable additional chain-extenders which may be used include amino-compounds as here above described, amino alcohols or polyols of Mw below 1000, preferably in the range of 60 to below 1000.

Examples of suitable amino alcohols are ethanolamine, diethanolamine, isopropanolamine, bis(2-hydroxyethyl)- and bis(2-hydroxy-propyl) aniline, and bis alkanol derivatives of piperazine or 2-methyl-piperazine.

Suitable polyols having molecular weights below 1000 include aliphatic diols and triols such as 1,4-butanediol, 1,6-hexanediol, ethylene-, diethylene-, and dipropylene glycol, neopentyl glycol, as well as low molecular weight adducts of propylene oxide of trimethylolpropane and glycerol as well as simple polyhydric alcohols such as trimethylolpropane, glycerol and 1,2,6-hexanetriol.

Aromatic cycloaliphatic and heterocyclic diols can also be used and include 1,4-bis(hydroxyethyl) hydroquinone, bis(hydroxyethyl)- and bis(2-hydroxypropyl) bisphenol A, hydrogenated bisphenol A(2,2-bis(4hydroxycyclohexyl)propane, cyclohexane 1,4-diol, and 1,4-bis(hydroxyethyl)piperazine. Bis(2-hydroxypropyl-)isophthalate (Arco Chemical Co.) and bis (2-hydroxyethyl)carbamate (Jefferson Chemical Co.) can also be used, as can low molecular weight, hydroxyl-terminated polyesters, including poly(caprolactones).

The amount of $H_2O$ to be used in the present invention should be of at least 1.5% by weight of high Mw isocyanate-reactive compound(s).

Preferably, the amount of $H_2O$ used should not exceed 10% by wt of high Mw isocyanate-reactive compound(s). More preferably, the amount of $H_2O$ used should range from 2.5% to 6% most preferably from 2.5% to 5% by wt of high Mw isocyanate-reactive compound(s).

It is a particular aspect of the present invention to provide flexible foams which are mainly water-blown and substantially halocarbon-free. However, additional amounts of inert physical blowing agents may be used.

Suitable blowing agents which may be used include dissolved or dispersed gases such as air, $CO_2$ or $N_2$ which may be injected or may be generated in situ by a chemical reaction or by the vaporisation of volatile liquids. Further suitable blowing agents may be inert liquids having boiling points not exceeding 100° C., preferably not exceeding 50° C., at atmospheric pressure. As examples of such liquids, there may be mentioned hydrocarbons, chlorinated hydrocarbons, fluorinated hydrocarbons and chlorofluorocarbons.

In addition to the ingredients already mentioned, the foam forming reaction mixture may contain one or more other conventional ingredients of such reaction mixtures. As examples of other such optional ingredients, there may be mentioned catalysts, surfactants, foam stabilisers, fire retardants, fillers, dyes, pigments and internal mould release agents.

Catalysts which may be used include materials already proposed as catalysts for isocyanate-based foam systems, for example tertiary amines, tin compounds and alkali metal salts of carboxylic acids.

Surfactants and foam stabilisers which may be used include siloxane-oxyalkylene copolymers.

Suitable surfactants also include, for example, sodium salts of castor oil sulfonates, alkali metal or ammonium salts of sulfonic acids such as dodecyl benzene sulfonic acid; and polyether siloxanes having a structure such that a copolymer of oethylene oxide and propylene oxide is attached to a polydimethyl siloxane radical. The amount of surfactant used is less than about 2 percent by weight of the total reactants, preferably less than 1%.

The method of the invention provides advantages in respect of foam properties. It is a further advantage of the present method to provide processing flexibility, mainly by allowing the coverage of a broad range of isocyanate indices. This provides the possibility to cover a broad range of hardness values for the foamed end-products, while retaining their good physical properties without varying the density of the foams. Thus, according to the present method, the isocyanate indices may vary from 40 to 120, preferably from 50 to 100, most preferably from 60 to 90.

The method of the invention may be performed to produce moulded or slabstock foams, by mixing the components in any convenient manner, continuously or discontinuously.

It is a particular advantage of the invention to provide moulded foams having good physical properties, by using reduced amounts of only one amino-functional chain-extender. The present invention further provides a reaction system suitable for performing the process of the invention, which comprises:

A. an organic polyisocyanate composition

B. an isocyante-reactive composition containing:

a. at least one high Mw isocyanate-reactive compound $b_1$. an amino-functional compound (so-called chain-extender) of Mw below 1000 a primary or secondary in an amount of less than 1% by wt of high Mw isocyanate-reactive compound(s) or $b_2$. a mixture of at least two chain extenders of which at least one is an amino-functional compound of Mw below 1000, in an amount of 0.1% to 10% by wt of high Mw isocyanate-reactive compound(s)

C. $H_2O$

D. optionally catalysts

E. optionally further blowing agents which are different from $H_2O$

F. optionally further conventional additives.

The invention is illustrated but not limited by the following Examples:

EXAMPLE 1

Flexible polyurethane/polyurea foams were prepared by mixing together, under foam-forming conditions, an isocyante composition consisting of a mixture comprising polymethyl polyphenylene polyisocyanate having an NCO content of 30.6% (referred to as polymeric MDI) and a glycol modified MDI containing 20% 2,4' MDI (of NCO content 26.85%) with isocyanate-reactive compositions outlined in Table 1 below.

The reaction mixture was stirred for 6 sec. at room temperature at about 5000 rpm.

The proportions used, foaming conditions and foam densities are described in Table 2.

TABLE 1

| Ingredients (parts by weight) | Compositions | | | | | | | |
|---|---|---|---|---|---|---|---|---|
| | 1a | 1b | 1c | 1d | 1e | 1f | 1g | 1h |
| Polyethyleneoxide/polypropylene oxide polyether triol (17% ethylene oxide tipped) having a OH number of 35 | 80.0 | 80.0 | 80.0 | 80.0 | 80.0 | 80.0 | 80.0 | 80.0 |
| Polyethyleneoxide/polypropylene oxide polyether diol (15% ethylene oxide tipped) having a OH number of 28 | 20.0 | 20.0 | 20.0 | 20.0 | 20.0 | 20.0 | 20.0 | 20.0 |
| DABCO catalyst (a 33% solution of triethylene diamine in dipropylene glycol) marketed by Air Products Inc. | 1.0 | 1.0 | 1.0 | 1.0 | 1.0 | 1.0 | 1.0 | 1.0 |
| NIAX C 174 catalyst (a 30% solution of a tertiary amine catalyst in dipropylene glycol) supplied by Union Carbide | 0.2 | 0.2 | 0.2 | 0.2 | 0.2 | 0.2 | 0.2 | 0.2 |
| A silicon surfactant supplied by Th. Goldschmidt as Tegostab B 4113 | 0.5 | 0.5 | 0.5 | 0.5 | 0.5 | 0.5 | 0.5 | 0.5 |
| Diethyl toluene diamine (DETDA) | 1.0 | 1.0 | 1.0 | 1.0 | 1.0 | 0.5 | 1.0 | 1.0 |
| Diethanol amine (DELA) | 0.5 | 1.0 | 1.5 | 2.0 | — | — | — | — |
| Monoethanol amine (MELA) | — | — | — | — | 0.5 | — | — | — |
| Isophorone diamine | — | — | — | — | — | 0.5 | 0.7 | 0.7 |
| 1,4 butane diol | — | — | — | — | — | — | — | 0.1 |
| $H_2O$ | 3.4 | 3.4 | 3.4 | 3.4 | 3.4 | 3.4 | 3.4 | 3.4 |

TABLE 2

| Ingredients (parts by weight) | Foams | | | | | | | |
|---|---|---|---|---|---|---|---|---|
| | I | II | III | IV | V | VI | VII | VIII |
| Isocyanate composition | 64 | 64 | 64 | 64 | 64 | 64 | 64 | 64 |
| Isocyanate-reactive compositions: | | | | | | | | |
| 1a | 100 | | | | | | | |
| 1b | | 100 | | | | | | |
| 1c | | | 100 | | | | | |
| 1d | | | | 100 | | | | |
| 1e | | | | | 100 | | | |
| 1f | | | | | | 100 | | |
| 1g | | | | | | | 100 | |
| 1h | | | | | | | | 100 |
| Foaming conditions | | | | | | | | |
| Cream | 9 | 9 | 8 | 7 | 9 | 12 | 10 | 8 |

TABLE 2-continued

| Ingredients (parts by weight) | Foams I | II | III | IV | V | VI | VII | VIII |
|---|---|---|---|---|---|---|---|---|
| time (s) | | | | | | | | |
| String time (s) | 70 | 60 | 50 | 45 | 60 | 90 | 70 | 45 |
| End of rise time (s) | 85 | 80 | 70 | 65 | 90 | 110 | 90 | 75 |
| Density (kg/m$^3$) | 39.9 | 39.7 | 42.6 | 46 | 37 | 36 | 36 | 33.6 |

EXAMPLE 2

Flexible polyurethane/polyurea foams were prepared—as described in Example 1—by mixing together under foam-forming conditions, an isocyanate blend having an NCO content of 26.7%, containing 80% of an isocyanate composition supplied by ICI PLC under the commercial name SUPRASEC VM28, and 20% of an MDI composition comprising 20% of 2,4" MDI, supplied by ICI PLC under the name SUPRASEC ML, with isocyanate-reactive compositions 2a, 2b, 2c, 2d outlined in Table 3 herebelow, at an isocyanate index of 78.

The foaming conditions and foam properties are described in Table 4 herebelow.

Results clearly indicate that the use of DETDA in amounts below 1% by wt leads to foams showing good physical/structural properties, while formulations having no DETDA or more than 1% by wt of DETDA per 100 parts of polyol are giving foams showing poor structural properties.

It further appears from column IId of Table 4 that the use of more than 1% by wt of DETDA resulted in inferior processing characteristics (e.g. strong reduction in string time).

TABLE 3

| Ingredients (parts by weight) | compositions 2a (comparative) | 2b | 2c | 2d (comparative) |
|---|---|---|---|---|
| Trifunctional ethylene oxide tipped polyether polyol (17% EO-tipped) of OH number 35 | 100.0 | 100.0 | 100.0 | 100.0 |
| NIAX C-174 | 0.1 | 0.1 | 0.1 | 0.1 |
| X-8154 (a urethane-promoting catalyst supplied by Air Products Inc.) | 0.5 | 0.5 | 0.5 | 0.5 |
| DMAPA (an amino-catalyst supplied by BASF AG) | 0.2 | 0.2 | 0.2 | 0.2 |
| B 4113 | 1.0 | 1.0 | 1.0 | 1.0 |
| WATER | 4.0 | 4.0 | 4.0 | 4.0 |
| DETDA | 0.0 | 0.4 | 0.8 | 1.2 |

TABLE 4

| Ingredients | Foams IIa (comparative) | IIb | IIc | IId (comparative) |
|---|---|---|---|---|
| Isocyanate composition of NCO content 26.7% | X | X | X | X |
| Isocyanate-reactive compositions | 2a | 2b | 2c | 2d |
| Isocyanate index | 78 | 78 | 78 | 78 |

TABLE 4-continued

| Ingredients | Foams IIa (comparative) | IIb | IIc | IId (comparative) |
|---|---|---|---|---|
| Foaming conditions | | | | |
| Cream time (sec) | 11-12 | 10-11 | 10 | 9 |
| String time (sec) | 63 | 59 | 57 | 47 |
| End of rise time (sec) | 73 | 71 | 71 | 68 |
| Foam properties | | | | |
| % recession | 30% | 22% | 22% | 30% |
| Structure | Internal collapse | Suitable foams | Suitable foams | Bad skin |

We claim:

1. A method to prepare polyurethane and/or polyurea flexible foams which comprises reacting:

A. an organic polyisocyanate composition

B. an isocyanate-reactive composition containing:

a. at least one high Mw isocyanate-reactive compound $b_1$. a compound selected from the group consisting of DETDA and isophorone diamine of Mw below 1000 in an amount of less than 1% by wt of high Mw isocyanate-reactive compound(s) or $b_2$. a mixture of at least two chain extenders of which at least one is a compound selected from the group consisting of DETDA and isophorone diamine of Mw below 1,000, in an amount of 0.1% to 10% by wt of which Mw isocyanate-reactive compound(s)

C. $H_2O$

D. optionally catalysts

E. optionally further blowing agents which are different from $H_2O$.

F. optionally further conventional additives.

2. A method according to claim 1 in which the primary or secondary amino-functional compound in the mixture $b_2$ is present in an amount of less than 1% by weight of high Mw isocyanate-reactive compound(s).

3. A method according to any one of claims 1 or 2, wherein the high molecular weight isocyanate-reactive compound(s) has/have a molecular weight of 1000 to 10,000, and a functionality of 2–4, and are selected from the group consisting of polyoxyalkylene polyether polyols and polyoxyalkylene polyether polyamines.

4. A method according to [any one of the preceding claims] *claim 3* wherein the mixture of chain-extenders $b_2$ comprises a second chain-extender selected among amino-compounds, amino-alcohols, polyols.

5. A method according to [any one of the preceding claims] *claim 4* wherein there is used $H_2O$ in an amount of 1.5% to 10% by wt of high Mw isocyanate-reactive compound(s).

6. A method according to claim 5 wherein there is used $H_2O$ in an amount of 2.5% to 6% by weight of high Mw isocyanate-reactive compound(s).

7. A method according to [any one of the preceding claims] *claim 6* wherein the isocyanate composition (A), the isocyanate-reactive composition (B) and $H_2O$ are used in such amounts to provide an isocyanate index ranging from 40 to 120.

8. A method according to claim 7 wherein there is provided an isocyanate index ranging from 50 to 100.

9. A reaction system for performing a method according to any one of the preceding claims which comprises;

A. an organic polyisocyanate composition

B. an isocyanate-reactive composition containing;

a. at least one high Mw isocyanate-reactive compound $b_1$. an amino-functional compound (so-called chain-extender) of Mw below 1000 a primary or secondary in an amount of less than 1% by wt of high Mw isocyanate-reactive compound(s) or $b_2$. a mixture of at least two chain extenders of which at least one is an amino-functional compound of Mw below 1000, in an amount of 0.1% to 10% by wt of high Mw isocyanate-reactive compound(s)

C. $H_2O$

D. optionally catalysts

E. optionally further blowing agents which are different from $H_2O$

F. optionally further conventional additives.

10. A flexible foam which is obtained by using a method according to [any one of claims 1 to 8] *claim 1* or which is obtained by using a reaction system according to claim 9.

* * * * *